(12) United States Patent
Yamada et al.

(10) Patent No.: US 8,893,999 B2
(45) Date of Patent: Nov. 25, 2014

(54) WEBBING TAKE-UP DEVICE

(75) Inventors: Kazuhiro Yamada, Aichi-ken (JP);
Akira Sumiyashiki, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 196 days.

(21) Appl. No.: 13/542,728

(22) Filed: Jul. 6, 2012

(65) Prior Publication Data
US 2013/0008994 A1     Jan. 10, 2013

(30) Foreign Application Priority Data

Jul. 7, 2011  (JP) .................................. 2011-151214

(51) Int. Cl.
*B60R 22/40* (2006.01)

(52) U.S. Cl.
CPC ..................................... *B60R 22/40* (2013.01)
USPC ................... 242/383.2; 242/384.5; 242/384.6

(58) Field of Classification Search
USPC ....................... 242/384.5–384.6, 383.2–383.5
See application file for complete search history.

(56) References Cited

U.S. PATENT DOCUMENTS

| 7,290,730 B2 * | 11/2007 | Nagata et al. ................. 242/374 |
| 7,624,940 B2 * | 12/2009 | Kitazawa et al. ............. 242/374 |
| 2013/0341452 A1 * | 12/2013 | Nakaoka et al. .............. 242/382 |

FOREIGN PATENT DOCUMENTS

| JP | S59-105465 | 6/1984 |
| JP | 2009-241879 | 10/2009 |

OTHER PUBLICATIONS

Japanese Office Action dated Jun. 17, 2014 and English translation thereof.

* cited by examiner

*Primary Examiner* — Sang Kim
(74) *Attorney, Agent, or Firm* — Roberts Mlotkowski Safran & Cole P.C.

(57) ABSTRACT

In an acceleration sensor, a guide portion is formed on a swing push-us member contiguous to a pushing portion and further to a pull-out direction side than the pushing portion. A top-edge portion of the guide portion is sloped to gradually get lower on progression away from the pushing portion in the pull-out direction. When a coupling claw moves in the take-up direction together with the sensor gear, the guide portion contacts the coupling claw from below the leading end of the coupling claw. The guide portion swings the coupling claw upwards as the sensor gear is rotating in the take-up direction, and guides the coupling claw to be on the pushing portion. The swing push-us member can be prevented from unintentionally obstructing the coupling claw when the sensor gear is returning to the initial position, even without provision of structure to restrict the swing push-us member from rising.

6 Claims, 8 Drawing Sheets

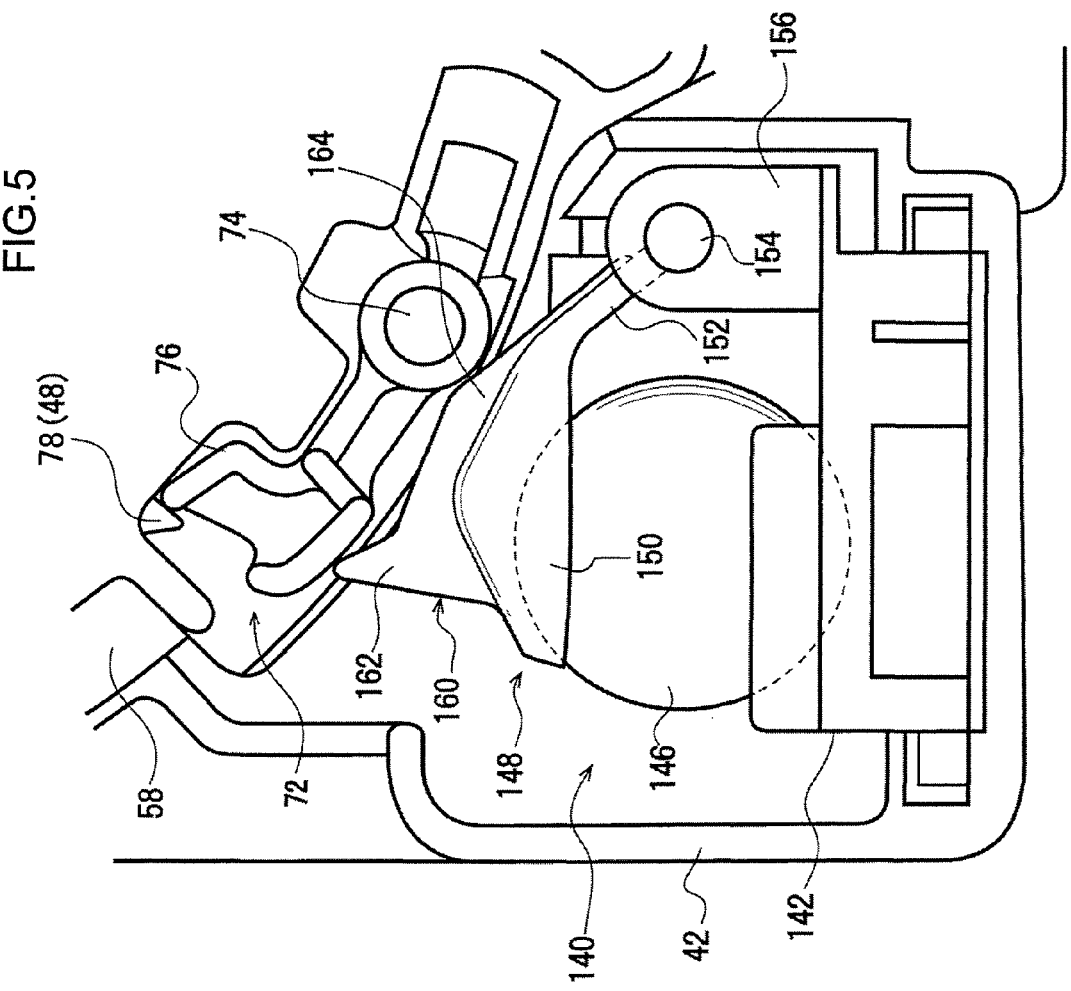

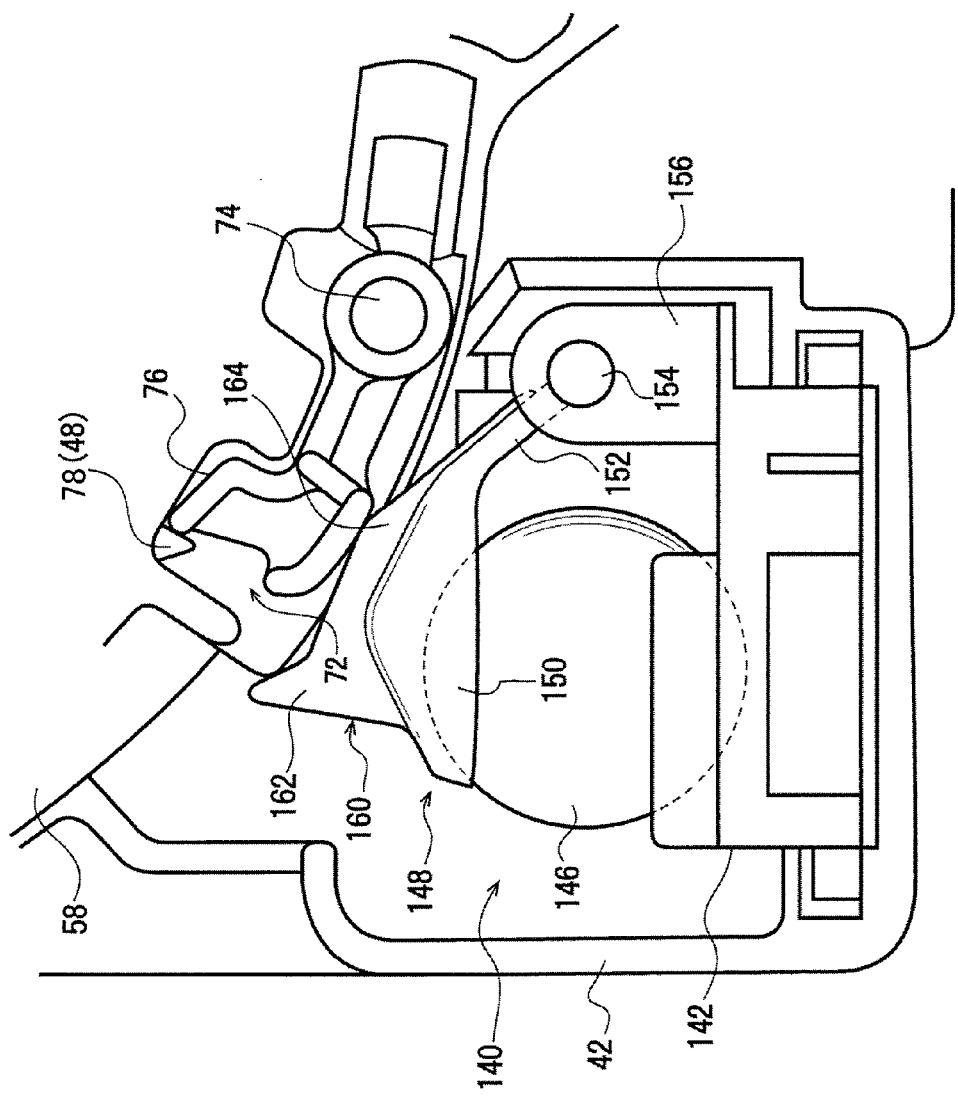

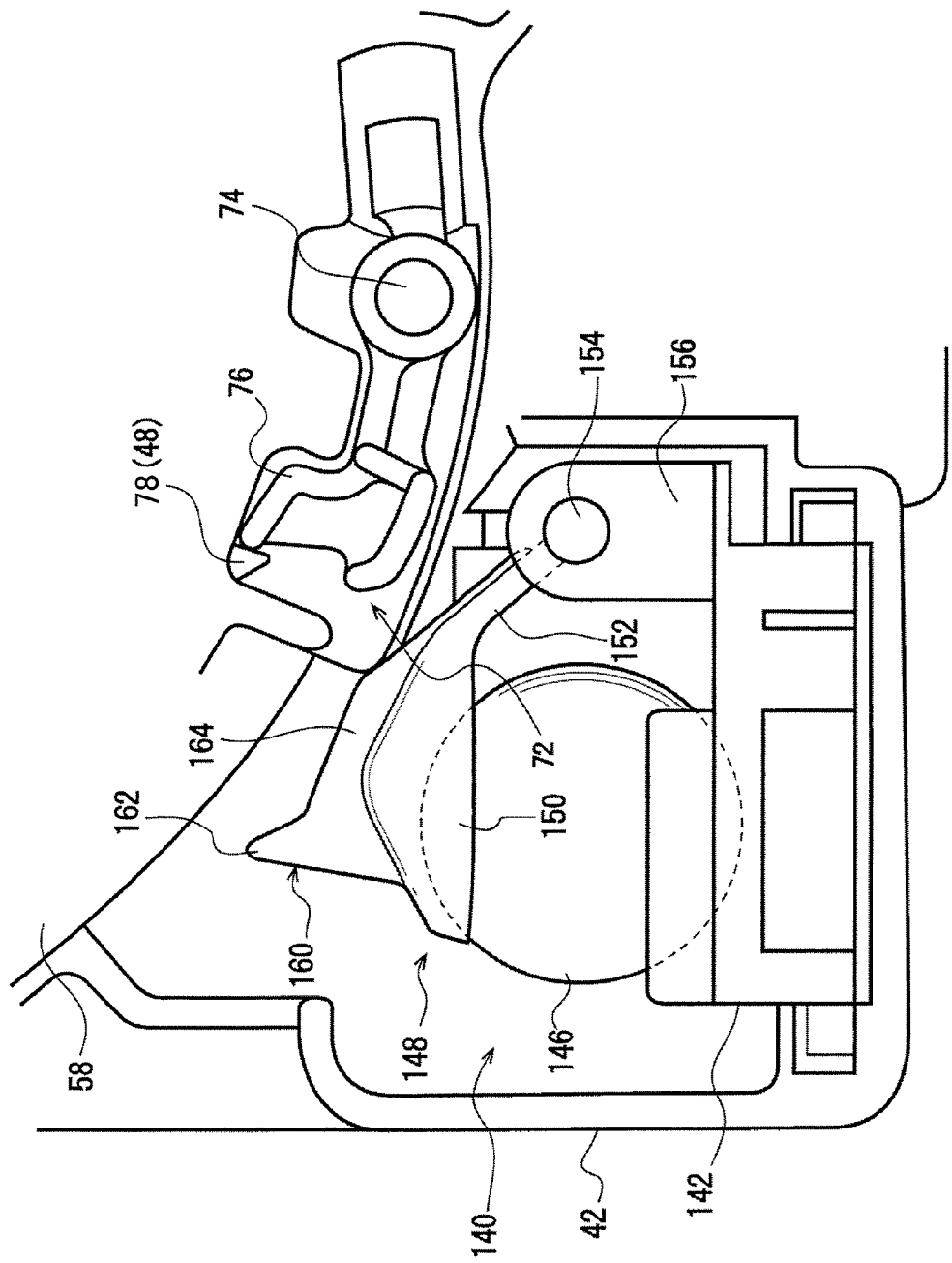

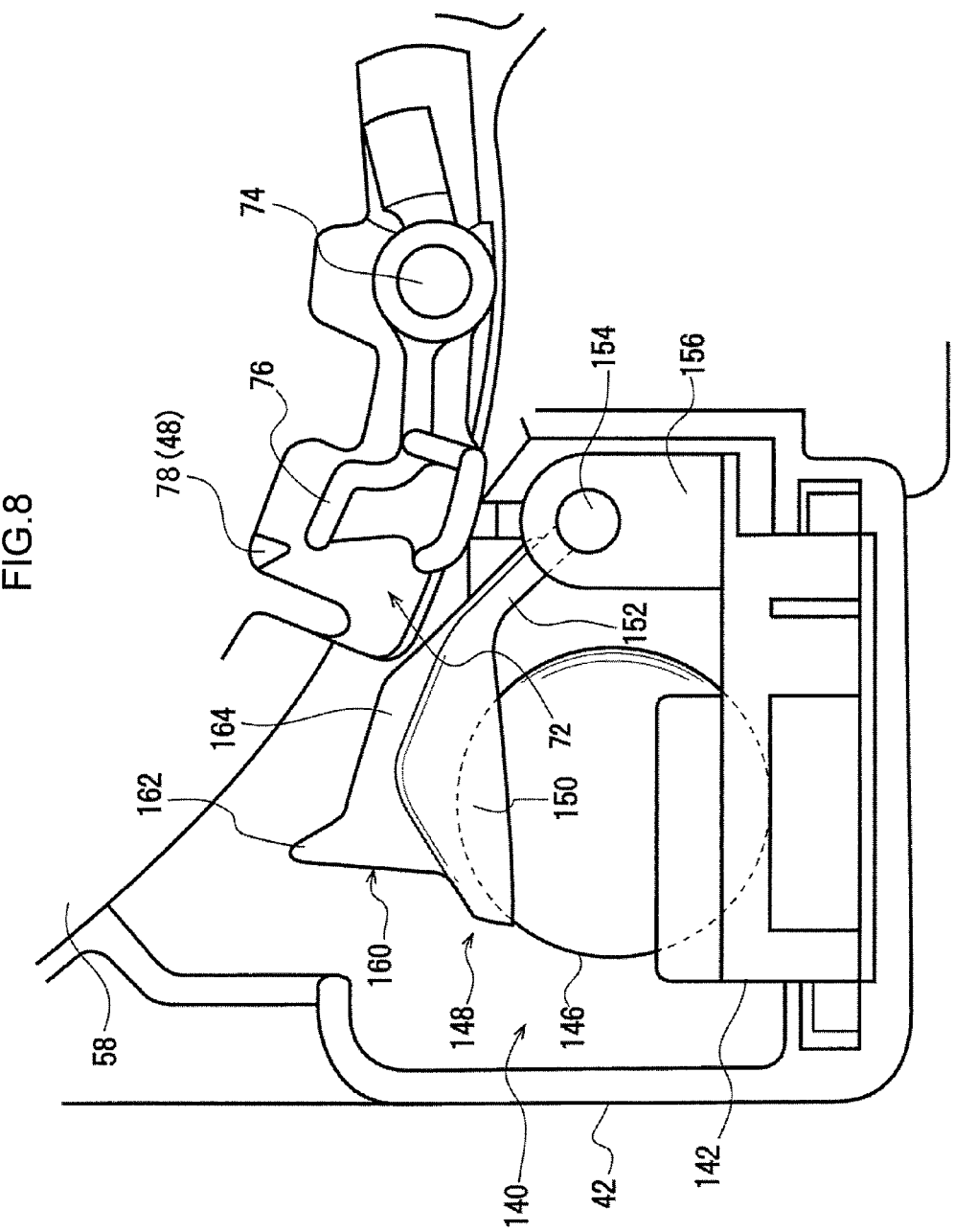

WEBBING TAKE-UP DEVICE

CROSS-REFERENCE TO RELATED APPLICATION

This application claims priority under 35 USC 119 from Japanese Patent Application No. 2011-151214 filed Jul. 7, 2011, the disclosure of which is incorporated by reference herein.

BACKGROUND OF THE INVENTION

1. Field of the Invention

The present invention relates to a webbing take-up device configuring a vehicle seatbelt device.

2. Description of the Related Art

In a seatbelt retractor (a webbing take-up device) described in Japanese Patent Application Laid-Open (JP-A) No. 2009-241879, after a lock mechanism has been actuated and a guide drum (spool) is restricted from rotation in the pull-out direction, a clutch (rotating body) is rotated backwards by biasing force of a return spring (biasing member) so as to return to the initial position. In a state in which the clutch has returned to the initial position, unless a pilot arm (coupling member) swings downwards and meshing with teeth of a locking gear is released, the lock mechanism activates again due to rotation of the guide drum in the pull-out direction.

In this state, if a vehicle sensor lever (swing push-up member) of a vehicle sensor (acceleration sensor) moves upwards, the leading end of the sensor lever interferes with the pilot arm, so the pilot arm cannot swing downwards. The configuration disclosed in JP-A No. 2009-241879 therefore has a guide block is formed to the clutch, and by the guide block obstructing the vehicle sensor lever from above, it is restricted that the vehicle sensor lever swings upwards when the clutch is returning to its initial position.

In such a configuration that the swing push-up member is restricted from unintentionally rising when the rotating body such as the clutch is returning to its initial position by the swing push-up member, such as the vehicle sensor lever, configuring the acceleration sensor being interfered from above with the guide block. The swing push-up member must accordingly be provided with sufficient rigidity and mechanical strength to withstand interference such as from the guide block. This accordingly results in the swing push-up member becoming larger and/or an increase in weight of the swing push-up member.

SUMMARY OF THE INVENTION

In consideration of the above circumstances, the present invention provides a webbing take-up device in which it is possible to make a swing push-up member for pushing up a coupling member and engaging with a rotating body both more compact and lighter.

A webbing take-up device according to a first aspect of the present invention includes: a spool that takes up a webbing from a base end side of the webbing by rotating in a take-up direction; a rotation body that is provided so as to be rotatable relative to the spool, and that actuates a locking section which restricts rotation of the spool in the pull-out direction by rotating relative to the spool in the pull-out direction that is an opposite direction to the take-up direction; a biasing member that biases the rotation body towards an initial position that is a position of the rotation body prior to rotation in the pull-out direction; a coupling member that rotates together with the rotation body, the coupling member being provided so as to be capable of swinging upwards and downwards with respect to the rotation body, and the coupling member directly or indirectly engaging with the spool by swinging upwards so as to transmit rotation of the spool in the pull-out direction to the rotation body; and an acceleration sensor including: an inertia body that moves under inertia when a vehicle rapidly decelerates; and a swing push-up member that is capable of swinging upwards and downwards, the swing push-up member being pushed up by the inertia body due to the inertia body moving under inertia so as to swing upwards and pushing up the coupling member, the swing push-up member including: a pushing portion formed at the swing push-up member at a position that is below the coupling member in a state in which the rotation body is in the initial position, and a guide portion formed at the swing push-up member further to a pull-out direction side than the pushing portion, the guide portion contacting the coupling member from below when the rotation body that has been rotated in the pull-out direction is returning to the initial position such that the coupling member is guided to be on the pushing portion while the guide portion gradually pushes the coupling member upwards as the rotation body rotates to the initial position.

In the webbing take-up device according to the first aspect of the present invention the inertia body of the acceleration sensor pushes up the swing push-up member in a rapid vehicle deceleration state. The swing push-up member accordingly swings upwards, and the pushing portion of the swing push-up member pushes up the coupling member provided to the rotation body so that the coupling member swings upwards. The coupling member directly or indirectly engages with the spool due to swinging upwards, such that the spool and the rotation body become coupled together through the coupling member. In this state, the body of an occupant attempting to move towards the vehicle front under inertia pulls on the webbing, and the spool is accordingly rotated in the pull-out direction, the rotation body rotates in the pull-out direction against biasing force of the biasing member. The rotation body rotating in the pull-out direction actuates the lock section, thereby restricting rotation of the spool in the pull-out direction. The webbing is accordingly restricted from being pulled out from the spool.

When the rotation body that has been rotated together with the spool in the pull-out direction is then returning to its original initial position under the biasing force from the biasing member, the guide portion formed to the swing push-up member further to the pull-out direction side than the pushing portion makes contact with the coupling member from below the coupling member. As the coupling member rotates in this state together with the rotation body further towards the initial position side, the guide portion pushes up the coupling member gradually so as to swing the coupling member upwards. Hence the coupling member is moved to be on the pushing portion while the coupling member is being gradually swung upwards together as the rotation body is rotating towards the initial position side. Thus in the webbing take-up device according to the present invention, the swing push-up member can be prevented from being unintentionally interference on the coupling member due to the guide portion making contact with the coupling member from below the coupling member, even without a configuration to restrict interference on the swing push-up member to restrict the swing push-up member from rising being provided for example to the rotation body. The rigidity and mechanical strength of the swing push-up member therefore does not need to be set particularly high, and as a result it is possible to achieve a more compact and lighter swing push-up member.

A webbing take-up device according to a second aspect of the present invention is the first aspect of the present invention, wherein the guide portion and the pushing portion are contiguous to each other.

In the webbing take-up device according to the second aspect of the present invention, due to the guide portion and the pushing portion being contiguous to each other on the swing push-up member, the coupling member does not catch on the pushing portion when the rotation body is returning to its initial position, and the coupling member can return to be on the pushing portion.

In the above aspects, it is possible that the guide portion is sloped such that a height of the guide portion becomes gradually lower on progression away from the pushing portion in the pull-out direction.

In the above aspects, it is possible that as the rotation body rotates to the initial position, the coupling member relatively moves on the guide portion in a direction toward an end portion of the guide portion at the pushing portion side such that the coupling member is guided to be on the pushing portion.

As described above, in a webbing take-up device according to the present invention, the coupling member does not impact the pushing portion when the rotating body is returning to its initial position, and the coupling member does not receive a high load (push resistance force) from the pushing portion when the coupling member is returning to be on the pushing portion. The rigidity of the swing push-up member can accordingly be set to a low value, and the swing push-up member can also be made more compact.

BRIEF DESCRIPTION OF THE DRAWINGS

Exemplary embodiments of the present invention will be described in detail based on the following figures, wherein:

FIG. 5 is an enlarged side view illustrating a state in which a coupling member has been swung by a swing push-up member so as to be pressed upwards;

FIG. 6 is an enlarged side view corresponding to FIG. 4 and illustrating a coupling member in a risen state and a rotation body in a pull-out direction rotated state;

FIG. 7 is an enlarged side view corresponding to FIG. 4 and illustrating a state in which a rotation body has been rotated in the pull-out direction to a specific position; and FIG. 8 is an enlarged side view corresponding to FIG. 4 and illustrating a state in which the leading end of a coupling member and a guide portion face each other when a rotation body is returning to its initial position.

DETAILED DESCRIPTION OF THE INVENTION

Exemplary Embodiment Configuration

Figure 1:
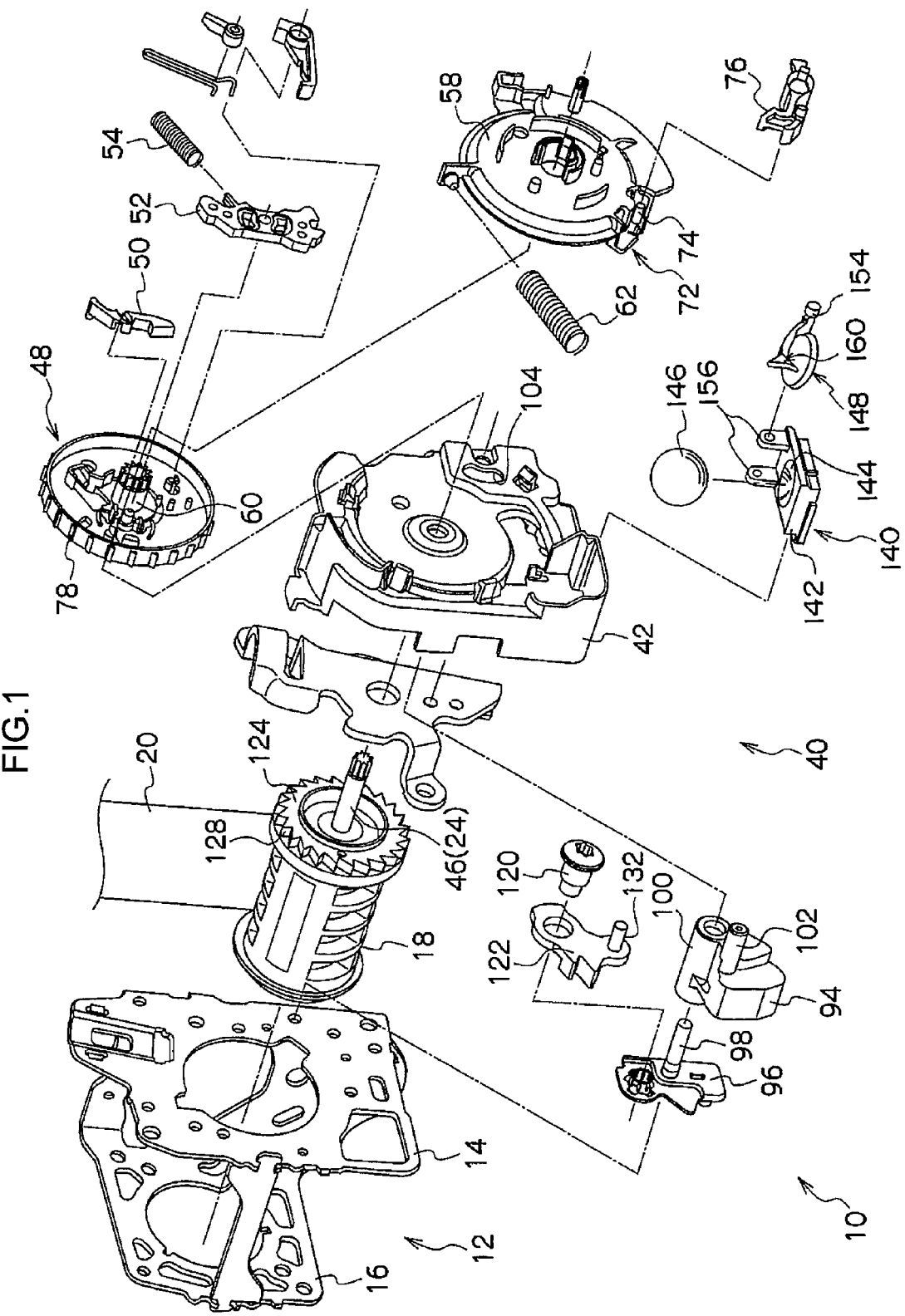
FIG. 1 is an exploded perspective view illustrating a configuration of relevant portions of a webbing take-up device according to an exemplary embodiment of the present invention.

FIG. 1 is an exploded perspective view schematically illustrating an overall configuration of a webbing take-up device 10 according to an exemplary embodiment of the present invention.

As shown in FIG. 1, the webbing take-up device 10 is provided with a frame 12. The frame 12 is, for example, provided with a pair of leg plates 14, 16 that face each other substantially along the vehicle front-rear direction. A spool 18 is provided between the leg plate 14 and the leg plate 16. The spool 18 is formed in a substantially circular cylindrical shape with an axial direction running along the direction the leg plates 14, 16 face each other.

A length direction base end side of elongated strip shaped webbing 20 is anchored (caught) to the spool 18. The webbing 20 is taken up from its length direction base end side when the spool 18 is rotated in a take-up direction, this being one rotation direction about the center axis line of the spool 18. The webbing 20 is thereby stored on an outer peripheral portion of the spool 18. The webbing 20 wound on the spool 18 is pulled out when the leading end side of the webbing 20 is pulled, and together with this action the spool 18 rotates in a pull-out direction that is the opposite direction to the take-up direction.

A bar shaped torsion shaft 24 is disposed inside the spool 18, with the length direction of the torsion shaft 24 running along the axial direction of the spool 18. The torsion shaft 24 is connected to the spool 18 in the vicinity of the end portion of the spool 18 on the leg plate 16 side, in a state such that the torsion shaft 24 is not rotatable relative to the spool 18.

A spool biasing member, not shown in the drawings, is connected to an end portion of the torsion shaft 24 on the leg plate 16 side, in a configuration such as a helical spring provided to the outside of the leg plate 16 (the opposite side of the leg plate 16 to the leg plate 14 side). Biasing force is generated by the spool biasing member when the torsion shaft 24 rotates in the pull-out direction together with the spool 18, and such biasing force acts through the torsion shaft 24 to rotate the spool 18 in the take-up direction. The webbing 20 can accordingly be taken up on the spool 18.

A sensor holder 42 of a lock mechanism 40 is attached to the leg plate 14 on the outside of the leg plate 14 (the opposite side of the leg plate 14 to the leg plate 16). The sensor holder 42 is formed with a recessed shape partially open towards the leg plate 14 side. A sensor cover, not shown in the drawings, is provided to the sensor holder 42 on the opposite side to that of the leg plate 14. The sensor holder 42 is accordingly covered by the sensor cover, and a shaft portion 46 extending out from an end of the torsion shaft 24 is inserted through the sensor holder 42 and is rotatably supported thereby.

A V-gear 48 is provided to the sensor holder 42 on the opposite side to the leg plate 14 (namely between the sensor holder 42 and the sensor cover). The V-gear 48 is formed overall as a shallow-bottomed circular cylindrical shape (tray shape) opening along the spool 18 axial direction towards the opposite side to that of the leg plate 14. The V-gear 48 is coaxially and integrally attached to the shaft portion 46. A W-pawl 50 is provided to the V-gear 48 at a position separated in the V-gear 48 radial direction from the center axis line of the V-gear 48. The base end side of the W-pawl 50 is supported by the V-gear 48, such that the W-pawl 50 is able to swing with an axial direction in the same direction as the center axis line of the V-gear 48. The leading end side of the W-pawl 50 approaches towards, or separates from, the outer edge of the V-gear 48 by the W-pawl 50 swinging about the W-pawl 50 support position.

An inertia mass 52 is provided to the V-gear 48. The inertia mass 52 is supported by the V-gear 48 so as to be capable of swinging about an axial direction in the same direction as the center axis line of the V-gear 48. The inertia mass 52 pushes the W-pawl 50 when the inertia mass 52 supported by the V-gear 48 rotates (swings) in the take-up direction relative to the V-gear 48, such that the leading end side of the W-pawl 50 is caused to approach the outside edge of the V-gear 48. A compression coil spring 54 is provided at the side of the inertia mass 52. One end of the compression coil spring 54 is engaged with the inertia mass 52, so as to bias the inertia mass 52 in the pull-out direction.

A sensor gear 58 serving as a rotation body is provided to the V-gear 48 on the opposite side to the leg plate 14. The sensor gear 58 is formed as a shallow-bottomed circular cylindrical shape (tray shape) open towards the opposite side to the leg plate 14. The sensor gear 58 is rotatably supported on a circular cylindrical shaped boss 60 formed to the V-gear 48, with the shaft portion 46 piercing through the boss 60. A return spring 62 is provided as a biasing member in the vicinity of the sensor gear 58. The return spring 62 is configured for example with a compression coil spring. Biasing force increases when the sensor gear 58 rotates about the boss 60 in the pull-out direction, so as to bias the sensor gear 58 in the take-up direction.

Ratchet teeth, not shown in the drawings, are formed coaxially to the boss 60 on the inside of the sensor gear 58. The ratchet teeth of the sensor gear 58 intrude inside the V-gear 48. The leading end side of the W-pawl 50 engages with the ratchet teeth of the sensor gear 58 when the leading end side of the W-pawl 50 swings so as to approach the outside edge of the V-gear 48. As described above, the sensor gear 58 is rotatably supported by the boss 60 of the V-gear 48. When the V-gear 48 is rotated in the pull-out direction with the leading end side of the W-pawl 50 in an engaged state with the ratchet teeth of the sensor gear 58, the ratchet teeth of the sensor gear 58 are pushed by the leading end side of the W-pawl 50 such that the sensor gear 58 rotates together with the V-gear 48 in the pull-out direction.

A coupling claw attachment section 72 is formed to the sensor gear 58. A support shaft 74 is formed to the coupling claw attachment section 72 with an axial direction running along the axial direction of the spool 18. A coupling claw 76 serving as a coupling member is supported by the support shaft 74 so as to be capable of rotating about the support shaft 74.

The leading end of the coupling claw 76 approaches towards, or moves away from, the outer peripheral portion of the V-gear 48 by the coupling claw 76 swinging about the support shaft 74. Ratchet teeth 78 are formed to the outer peripheral portion of the V-gear 48 so as to correspond to the coupling claw 76. The leading end of the coupling claw 76 meshes with the ratchet teeth 78 when the coupling claw 76 swings upwards to approach an outer peripheral portion of the V-gear 48. Rotation of the V-gear 48 is transmitted to the sensor gear 58 through the ratchet teeth 78, the coupling claw 76, the support shaft 74 and the coupling claw attachment section 72 when the V-gear 48 is rotated in the pull-out direction in this state. The sensor gear 58 is accordingly rotated in the pull-out direction.

Figure 2:
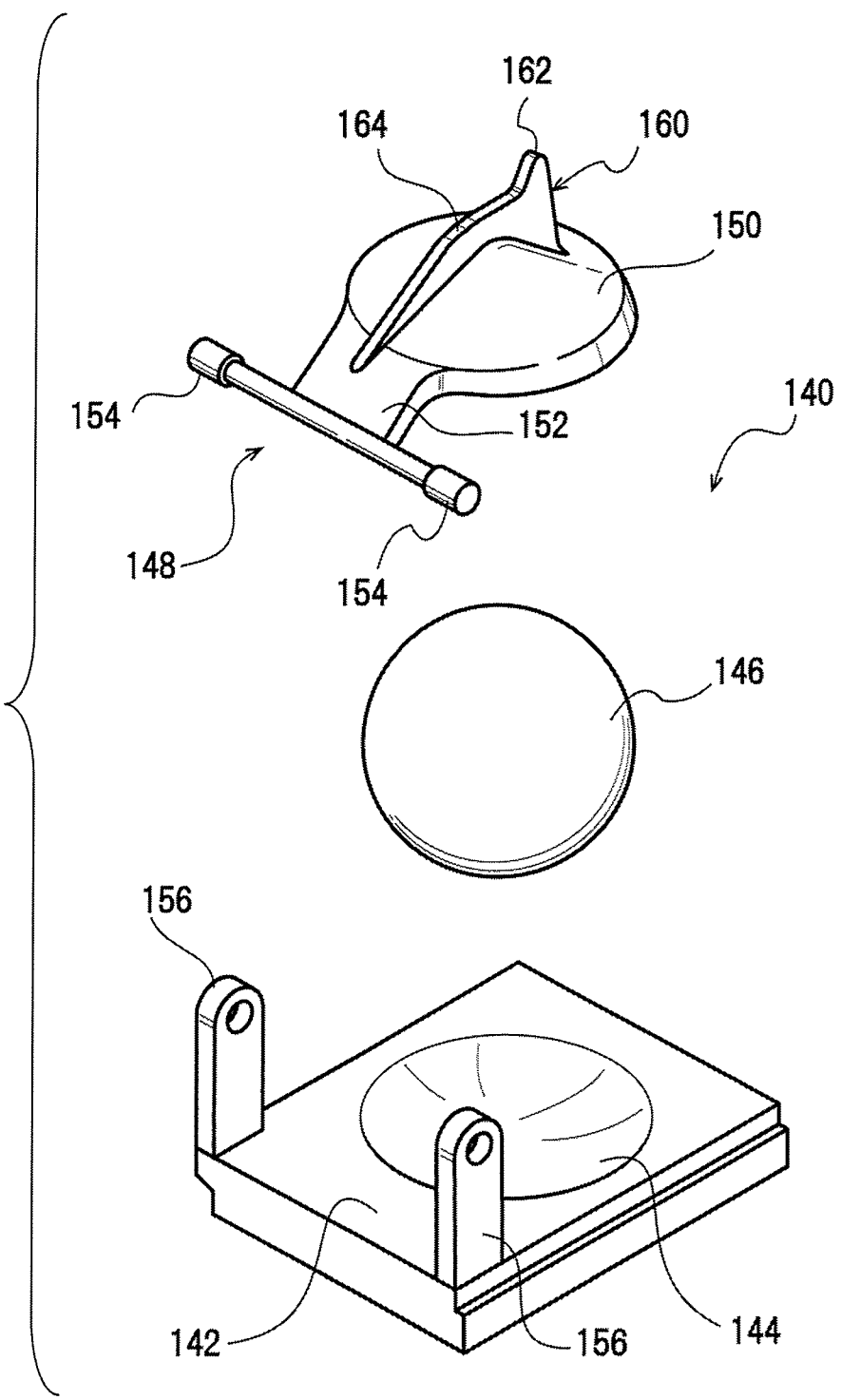
FIG. 2 is an enlarged exploded perspective view of an acceleration sensor of a webbing take-up device according to an exemplary embodiment of the present invention.

An acceleration sensor 140 is provided to the sensor holder 42 at the take-up direction downstream side from the lowermost rotation position of the sensor gear 58. As shown in FIG. 2, the acceleration sensor 140 is provided with a sensor frame 142. A mounting portion 144 is provided on the sensor frame 142. The mounting portion 144 is a recessed shaped sloping face that is either curved or sloped so as to open substantially towards the vehicle top direction. A hard sphere 146 serving as an inertia body is mounted on the mounting portion 144. A swing push-us member 148 is provided above the hard sphere 146.

Figure 3:
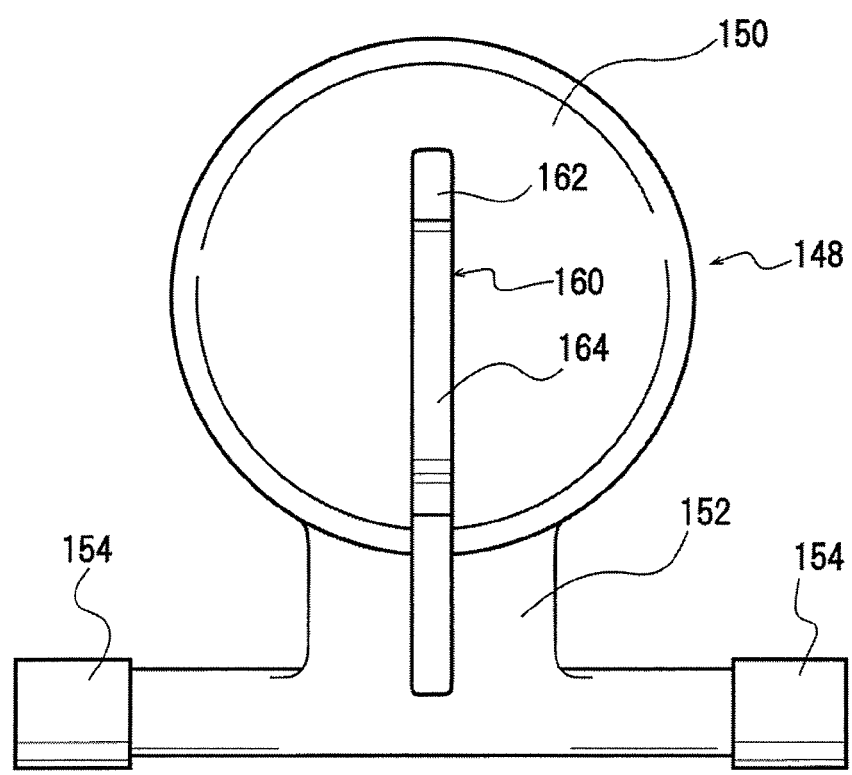
FIG. 3 is a plan view of a swing push-up member of the acceleration sensor.

As shown in FIG. 2 and FIG. 3, the swing push-us member 148 is provided with a substantially recess shaped body 150 that opens downwards. The body 150 is mounted on the hard sphere 146. A connection tab 152 extends out towards the pull-out direction side and downwards from the edge of the body 150 on the pull-out direction side. A shaft portion 154 is formed to the edge of the connection tab 152 on the opposite side to the body 150. The shaft portion 154 has an axial direction running substantially along the axial direction of the spool 18 and is rotatably supported by support portions 156 (see FIG. 2) that extend upwards from the sensor frame 142.

As shown in FIG. 2 and FIG. 3, a contact (abut) rib 160 is formed on the top face of the body 150 and the connection tab 152. The contact rib 160 is formed in a plate shape with the thickness direction of the contact rib 160 running along the axial direction of the spool 18. A pushing portion 162 is configured at an end portion of the contact rib 160 at the take-up direction side and the vicinity thereof. A portion of the contact rib 160 further to the pull-out direction side than the pushing portion 162 configures a guide portion 164. The top end portion of the pushing portion 162 is further away from the body 150 than the top edge portion of the guide portion 164, and the top end of the pushing portion 162 makes contact with the bottom face of the coupling claw 76 in a state in which rotation force in the pull-out direction is not imparted to the sensor gear 58.

The top edge portion of the guide portion 164 is sloped so as to become gradually lower (namely the top edge gets closer to the body 150) on progression away from the pushing portion 162 in the pull-out direction. The profile (slope) of the guide portion 164 is set such that an end portion of the guide portion 164 on the opposite side to the pushing portion 162 is positioned at the lower side of the leading end of the coupling claw 76 when the leading end of the coupling claw 76 approaches the contact rib 160 from the pull-out direction side in a state in which the coupling claw 76 is not engaged with the ratchet teeth 78.

In the thus configured acceleration sensor 140, the hard sphere 146 pushes up the swing push-us member 148 when the hard sphere 146 rolls over the mounting portion 144 and climbs the sloping face of the mounting portion 144. The swing push-us member 148 pushed up thus swings about the shaft portions 154 rotatably supported at the support portions 156 such that the leading end side (the side opposite to the shaft portions 154) of the swing push-us member 148 rises. The coupling claw 76 is positioned above the swing push-us member 148, so the leading end side of the swing push-us member 148 pushes up the coupling claw 76 when the leading end side of the swing push-us member 148 rises as the swing push-us member 148 rotates (swings). The leading end of the coupling claw 76 thereby mashes with the ratchet teeth 78.

As shown in FIG. 1, a link member 94 is provided in the vicinity of the coupling claw attachment section 72 on the leg plate 14 side of the sensor gear 58. A support body 96 is attached to the leg plate 14 of the frame 12 so as to correspond to the link member 94. A support shaft 98 is provided to the support body 96 with an axial direction facing in the same direction as the direction of the center axis line of the spool 18. A tube shaped body 100 is formed to the link member 94, and the support shaft 98 is insertable into the tube shaped body 100. The link member 94 is supported so as to be capable of rotating about the support shaft 98 by the support shaft 98 being fit-inserted into the tube shaped body 100.

Figure 4:
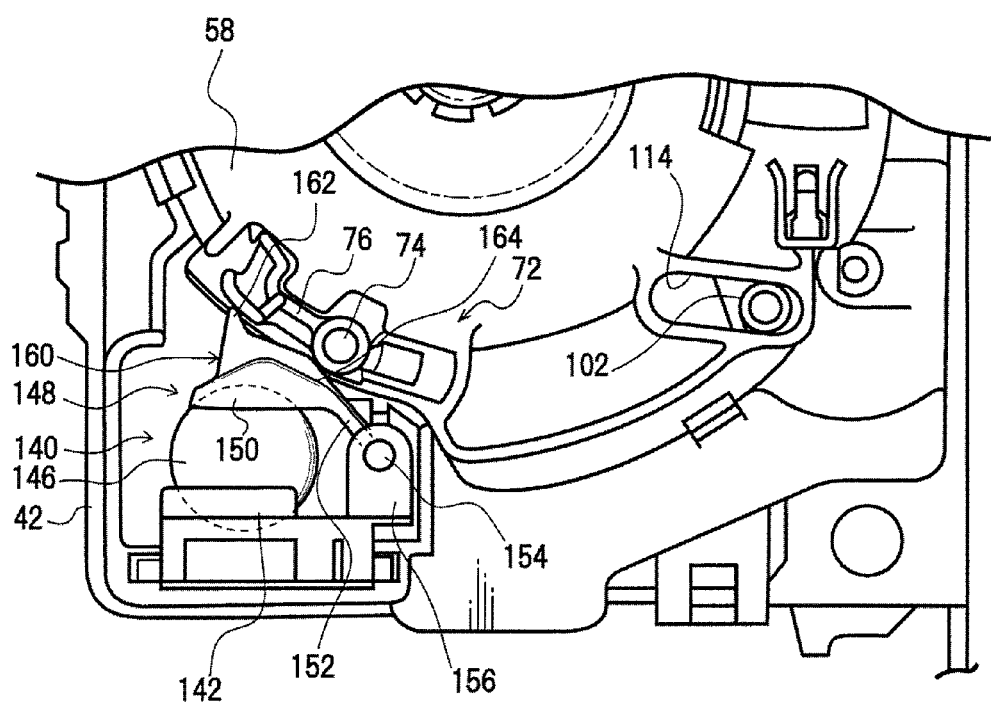
FIG. 4 is a side view of relevant portions of a webbing take-up device according to an exemplary embodiment of the present invention.

An engagement pin 102 is formed to the link member 94. The engagement pin 102 is formed so as to project out from the link member 94 at a position away from the center axis line of the tube shaped body 100, which is the center of rotation of the link member 94, in the link member 94 rotation radial direction. The engagement pin 102 projects out towards the sensor gear 58 side in the same direction as the axial direction of the spool 18. A through hole 104 is formed in the sensor holder 42 so as to correspond to the engagement pin 102. The engagement pin 102 passes through the through hole 104 and also passes through a guide hole 114 formed through the sensor gear 58 (see FIG. 4). The guide hole 114 is formed as an elongated hole having an internal width dimension slightly larger than the external diameter dimension of the engagement pin 102. The engagement pin 102 is pushed by the inner peripheral portion of the guide hole 114 when the sensor gear 58 rotates about the center axis line of the spool 18, so the link member 94 rotates (swings) about the support shaft 98.

A locking pawl 122 configuring a locking section is supported from the support body 96 by an attachment pin 120 so as to be capable of swinging about an axis with the same axial direction as the axial direction of the support shaft 98. A locking base 124 that also configures the locking section together with the locking pawl 122 is provided to the spool 18 so as to correspond to the locking pawl 122. A portion of the locking base 124 is fit-inserted from the open end side of the spool 18 on the leg plate 14 side, such that the locking base 124 is capable of relative rotation coaxially with respect to the spool 18. However the torsion shaft 24 passes through the locking base 124 in a non-relatively rotatable state. The locking base 124 is therefore connected through the torsion shaft 24 in a non-relatively rotatable state to the spool 18.

Ratchet teeth 128 are provided to an outer peripheral portion of the locking base 124. Ratchet teeth (locking teeth) capable of meshing with the ratchet teeth 128 are formed to the leading end side of the locking pawl 122. The ratchet teeth of the locking pawl 122 mesh with the ratchet teeth 128 (the locking base 124) when the leading end side of the locking pawl 122 has rotated (swung) to approach the outer peripheral portion of the ratchet teeth 128. Rotation of the locking base 124 in the pull-out direction is accordingly restricted when the ratchet teeth of the locking pawl 122 are in a meshed state with the ratchet teeth 128 (the locking base 124).

An engagement pin 132 is formed so as to project out from the locking pawl 122 at a position displaced in a radial direction from the pivotal (rotational) center of the locking pawl 122. The engagement pin 132 intrudes into an elongated hole shaped guide hole, not shown in the drawings, formed to the link member 94. When the sensor gear 58 rotates in the pull-out direction, the inner peripheral portion of the guide hole of the sensor gear 58 pushes the engagement pin 102 so as to rotate (swing) the link member 94 about the support shaft 98 in the take-up direction, the inner peripheral portion of the guide hole of the link member 94 pushes the engagement pin 132 and rotates the locking pawl 122 such that the ratchet teeth of the locking pawl 122 approach the ratchet teeth 128 (the locking base 124).

Operation and Advantageous Effects of the Present Exemplary Embodiment

Explanation follows regarding the operation and advantageous effects of the webbing take-up device 10. Note that some details may be omitted from the drawings mentioned hereinafter in order to facilitate understanding of the webbing take-up device 10, such as detailed shapes of each of the members described above.

In the webbing take-up device 10, the hard sphere 146 of the acceleration sensor 140 rolls towards the vehicle front side under inertia when a rapid vehicle deceleration state occurs in a state in which a seat occupant has pulled out the webbing 20 from the spool 18 and fitted the webbing 20 over his/her body. The hard sphere 146 accordingly rises up the sloped face of the mounting portion 144. The hard sphere 146 that has climbed the sloped face of the mounting portion 144 pushes up the body 150 of the swing push-us member 148, swinging the swing push-us member 148 upwards about the shaft portions 154. The swing push-us member 148 that has been swung upwards pushes the coupling claw 76 upwards from below with the pushing portion 162 of the contact rib 160 (the state illustrated in FIG. 5). The coupling claw 76 pushed upwards by the pushing portion 162 accordingly swings upwards, such that the coupling claw 76 meshes with the ratchet teeth 78 of the V-gear 48.

Rotation of the V-gear 48 is transmitted to the sensor gear 58 when, as shown in FIG. 6, the V-gear 48 is rotated in the pull-out direction in a state in which the coupling claw 76 is meshed with the ratchet teeth 78 of the V-gear 48. The sensor gear 58 accordingly rotates against biasing force from the return spring 62 and rotates together with the V-gear 48 in the pull-out direction, with the coupling claw 76. When the sensor gear 58 has rotated in the pull-out direction to a specific position, as shown in FIG. 7, the inner peripheral portion of the guide hole 114 in the sensor gear 58 pushes the outer peripheral portion of the engagement pin 102, thereby rotating (swinging) the link member 94 in the take-up direction.

When the link member 94 rotates (swings) in the take-up direction, the inner peripheral portion of the guide hole formed in the link member 94 pushes against the outer peripheral portion of the engagement pin 132 so as to rotate (swing) the locking pawl 122 in the take-up direction. When the engagement pin 132 reaches the other end of the guide hole by the locking pawl 122 swinging, the leading end (teeth tips) of the ratchet teeth 128 of the locking base 124, or portions in the vicinity thereof, contact the leading end (teeth tips) of the ratchet teeth of the locking pawl 122.

In this state, when the locking base 124 is rotated together with the spool 18 further in the pull-out direction, the ratchet teeth of the locking pawl 122 that are in contact with the ratchet teeth 128 of the locking base 124 are guided towards (gone into) the valley bottom side of the ratchet teeth 128. The ratchet teeth of the locking pawl 122 thereby mesh with the ratchet teeth 128 of the locking base 124, and the locking pawl 122 adopts a locked state, restricting rotation of the locking base 124 in the pull-out direction.

The locking base 124 is connected through the torsion shaft 24 to the spool 18 in a non-relatively rotatable state, so rotation of the spool 18 in the pull-out direction is accordingly restricted due to rotation of the locking base 124 in the pull-out direction being restricted. The webbing 20 is accordingly restricted from being pulled out from the spool 18, and so the body of the occupant can be strongly restrained by the webbing 20 when, for example, the body of the occupant attempts to move towards the vehicle front side under inertia in a rapid vehicle deceleration state.

From this state, when for example a normal travel state is resumed by the rapid vehicle deceleration state ending, then, as shown in FIG. 7, the hard sphere 146 returns to the bottom of the mounting portion 144, so the swing push-us member 148 swings back down. The coupling claw 76 then swings downwards when meshing of the coupling claw 76 and the ratchet teeth 78 of the V-gear 48 in this state is released. In this state, the sensor gear 58 then rotates in the take-up direction under biasing force from the return spring 62 to return to the initial position, and the leading end of the coupling claw 76 approaches the guide portion 164 of the swing push-us member 148.

Here, the profile (slope) of the guide portion 164 is set such that, in a state in which the coupling claw 76 is descended without being engaged with the ratchet teeth 78, when the leading end of the coupling claw 76 approaches the contact rib 160 from the pull-out direction side, as shown in FIG. 8, the end of the guide portion 164 at the side opposite to the pushing portion 162 is positioned at the lower side than the leading end of the coupling claw 76. Accordingly, the coupling claw 76 that is approached the guide portion 164 makes contact with the guide portion 164 at an intermediate portion between the end portion of the guide portion 164 at the pushing portion 162 side and the end portion at the opposite side thereto.

The guide portion 164 is also sloped such that the top edge portion of the guide portion 164 becomes gradually lower on progression away from the pushing portion 162 in the pull-out direction. Therefore, the coupling claw 76 relatively moves on the guide portion 164 in a direction toward the end portion of the guide portion 164 at the pushing portion 162 side, so the coupling claw 76 is pushed by the guide portion 164 and is gradually swung upwards as the sensor gear 58 rotates in the take-up direction to return to the initial position. The coupling claw 76 that has been gradually swung upwards by the guide portion 164 thereby returns to reach its initial position which is on the pushing portion 162 due to the sensor gear 58 returning to the initial position.

Thus in the webbing take-up device 10, when the sensor gear 58 is returning to its initial position, the guide portion 164 gradually swings the coupling claw 76 upwards until the coupling claw 76 has returned to be on the pushing portion 162. The coupling claw 76 therefore does not impact the pushing portion 162 of the swing push-us member 148 when the sensor gear 58 is returning to the initial position, and so swinging of the coupling claw 76 and rotation of the sensor gear 58 are not unintentionally restricted. An unnecessarily large load does not act on the bottom face of the coupling claw 76 and the contact rib 160, and the coupling claw 76 can be smoothly moved to be on the pushing portion 162.

Swinging of the coupling claw 76 and rotation of the sensor gear 58 are thus not unintentionally restricted and an unnecessarily large load does not act on the bottom face of the coupling claw 76 and the contact rib 160, so the coupling claw 76 can be smoothly moved to be on the pushing portion 162. Therefore, the leading end side of the swing push-us member 148 in the swing radial direction can accordingly be set further to the take-up direction side than the swing center. The placement position of the acceleration sensor 140 can accordingly be set further to the take-up direction side than the lowermost rotation position of the sensor gear 58.

The rigidity of the swing push-up member 148 is also increased due to forming the contact rib 160 on the swing push-us member 148. A thinner and more lightweight body 150 and connection tab 152 can accordingly be achieved for the swing push-us member 148. Due to being able to achieve a more compact and lighter weight swing push-up member 148, it consequently becomes easy for the swing push-us member 148 to be pushed up by the hard sphere 146, raising the sensitivity to acceleration, namely the sensitivity to deceleration during rapid vehicle deceleration, of the acceleration sensor 140.

In the present exemplary embodiment configuration is made with the pushing portion 162 and the guide portion 164 contiguous to each other. However configuration may be made with the pushing portion 162 and the guide portion 164 not contiguous as long as the coupling claw 76 is guided smoothly to the pushing portion 162. For example, in the swing push-us member 148 the pushing portion 162 and the guide portion 164 may be formed separately from each other, displaced from each other along the axial direction of the shaft portions 154.

What is claimed is:

1. A webbing take-up device comprising:
    a spool that takes up a webbing from a base end side of the webbing by rotating in a take-up direction;
    a rotation body that is provided so as to be rotatable relative to the spool, and that actuates a locking section which restricts rotation of the spool in the pull-out direction by rotating relative to the spool in the pull-out direction that is an opposite direction to the take-up direction;
    a rotation body biasing member that biases the rotation body towards an initial position that is a position of the rotation body prior to rotation in the pull-out direction;
    a coupling member that rotates together with the rotation body, the coupling member being provided so as to be capable of swinging upwards and downwards with respect to the rotation body, and the coupling member directly or indirectly engaging with the spool by swinging upwards so as to transmit rotation of the spool in the pull-out direction to the rotation body; and
    an acceleration sensor including: an inertia body that moves under inertia when a vehicle rapidly decelerates; and a swing push-up member that is capable of swinging upwards and downwards, the swing push-up member being pushed up by the inertia body due to the inertia body moving under inertia so as to swing upwards and pushing up the coupling member, the swing push-up member including:
    a pushing portion formed at the swing push-up member at a position that is below the coupling member in a state in which the rotation body is in the initial position, and
    a guide portion formed at the swing push-up member further to a pull-out direction side than the pushing portion, the guide portion contacting the coupling member from below when the rotation body that has been rotated in the pull-out direction is returning to the initial position such that the coupling member is guided to be on the pushing portion while the guide portion gradually pushes the coupling member upwards as the rotation body rotates to the initial position.

2. The webbing take-up device of claim 1 wherein the guide portion and the pushing portion are contiguous to each other.

3. The webbing take-up device of claim 2, wherein the guide portion is sloped such that a height of the guide portion becomes gradually lower on progression away from the pushing portion in the pull-out direction.

4. The webbing take-up device of claim 3, wherein as the rotation body rotates to the initial position, the coupling member relatively moves on the guide portion in a direction toward an end portion of the guide portion at the pushing portion side such that the coupling member is guided to be on the pushing portion.

5. The webbing take-up device of claim 1, wherein the guide portion is sloped such that a height of the guide portion becomes gradually lower on progression away from the pushing portion in the pull-out direction.

6. The webbing take-up device of claim 5, wherein as the rotation body rotates to the initial position, the coupling member relatively moves on the guide portion in a direction toward an end portion of the guide portion at the pushing portion side such that the coupling member is guided to be on the pushing portion.

* * * * *